Jan. 8, 1924.
E. FETTER
INNER TUBE
Filed Nov. 3, 1922        2 Sheets-Sheet 1
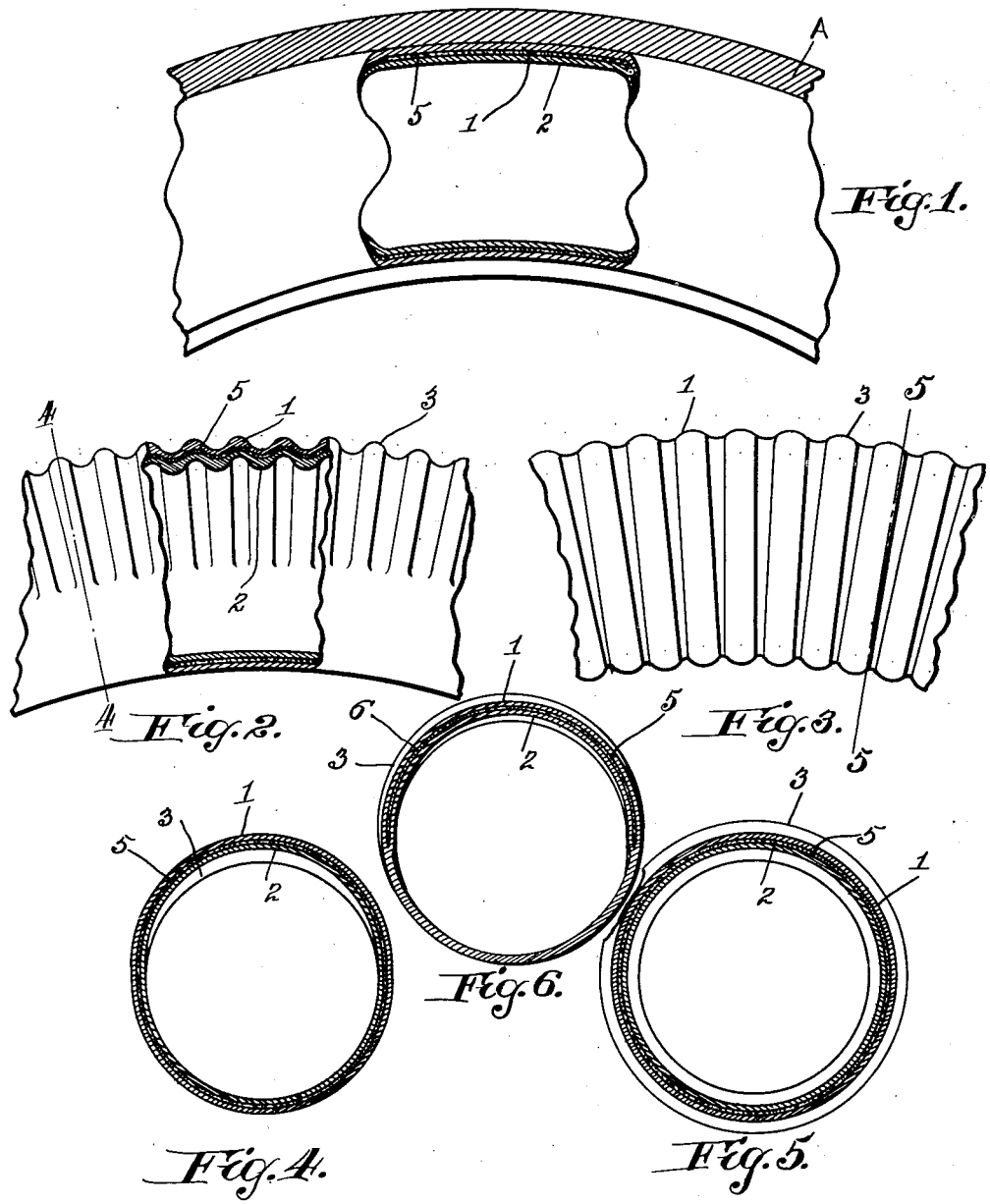

Jan. 8, 1924.

E. FETTER

INNER TUBE

Filed Nov. 3, 1922

Inventor
Edward Fetter
By Edwin H. Samuels
Attorney

Patented Jan. 8, 1924.

1,480,252

UNITED STATES PATENT OFFICE.

EDWARD FETTER, OF BALTIMORE, MARYLAND.

INNER TUBE.

Application filed November 3, 1922. Serial No. 598,947.

*To all whom it may concern:*

Be it known that I, EDWARD FETTER, a citizen of the United States of America, residing in the city of Baltimore, State of Maryland, have invented certain new and useful Improvements in Inner Tubes, of which the following is a specification.

The invention relates to inner tubes for pneumatic tires of the type which are provided with means for closing punctures immediately as formed, preventing deflation of the tire while in use.

The invention consists in providing in the tube an excess of the resilient material of which the tube is formed, ordinarily pure rubber so arranged that the puncture tends to close itself as soon as it is formed.

In accordance with the present invention, this excess of material is distributed in the form of transversely ranged folds or creases which appear in the tube when wholly or partially deflated, but which are so flattened as to be practically eliminated by pressure of the tube against the casing when in use, i. e. when it is placed in a casing and inflated.

The excess rubber thus distributed tends to exhaust and close any puncture which may be formed, being assisted in this by the air pressure which forces the surplus rubber into the opening. Another feature of the invention which further contributes to the result consists in the provision in the walls of the tube of a strata of raw rubber which is covered on both sides by vulcanized rubber so that it is preserved in the gummy adhesive condition for an indefinite period. Being protected from the air, there is no tendency for it to become dry, hard, and partially vulcanized as raw rubber does when it is exposed to the atmosphere.

The two features referred to form a most effective puncture healing device, either one may, however, be used separately to advantage. In the drawings I have illustrated a tube embodying the various features of my invention in what is at present considered the preferred form.

Figure 1, is a cross section of a fragment of a casing or shoe equipped with a tube in accordance with my invention, a portion of the tube being cut away to show a section thereof. The tube as shown is inflated causing the corrugations or folds to be flattened against the inner walls of the casing.

Fig. 2, is a side elevation of a portion of a tube, partially deflated so as to show the creases, crimps or folds.

Fig. 3, is a similar view of a slightly modified form of the tube in which the creases or folds extend entirely around the tube.

Fig. 4, is a section taken on line 4—4, transversely to the plane of Figure 2, showing the form of tube therein illustrated.

Fig. 5, is a similar view on line 5—5, illustrating the form shown in Figure 3.

Fig. 6, is a similar section showing still another form of the invention.

Figure 7:
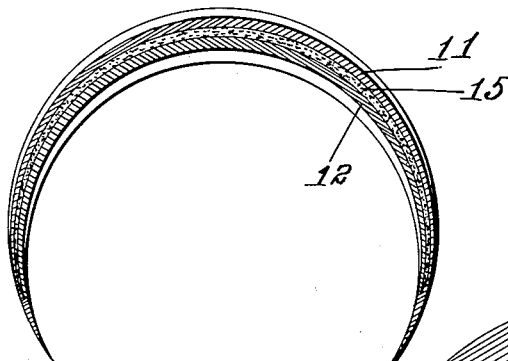
Fig. 7, is a transverse section showing a shield after the general pattern of that shown in my Patent No. 1,427,278, but embodying the pleated feature of the present invention.

Referring to the drawings, the outer casing is indicated by reference character A. The tube as illustrated consists of an outer tubular member 1, preferably of pure vulcanized rubber and an inner tubular member 2, likewise preferably of pure vulcanized rubber, these tubes being crimped or pleated preferably on transverse lines as indicated at 3. These pleats or folds as shown are so formed and are of such extent or depth that while they appear in the tube when partially inflated or wholly deflated, they disappear when the tube is inflated for use on account of the flattening of the tube against the inner surface of the casing. In the form shown in Figure 2, the pleats run half way around, being confined in effect to the tread area. In Figure 3, I have shown the pleats entirely encompassing the tube so that the surplus rubber is distributed over the entire area.

When the tube is inflated, and the surplus rubber distributed as described, it has the effect of closing any and all punctures by the tendency of the rubber to expand and cover any hole thus formed, due to the tendency of the edges to overlap on account of the surplus rubber instead of drawing away from the opening as they do when the tube is stretched when inoperative condition as is the ordinary inner tube.

The common type of plain tubes are made small, causing them to draw away from the edges of the casing to prevent pinching when the tire is mounted. This makes it necessary to make the tube of such proportions that it is stretched when in operation. Crimping the tube as described provides surplus rubber and makes stretching of the tube when mounted unnecessary. At the same time, it serves to draw the tube in, reducing its dimensions when it is only partially inflated or wholly deflated during the operation of mounting the tire. This draws it away from the edges of the casing as aforesaid and prevents pinching of the tube during the operation of mounting the tire.

Another feature of the invention consists in the combination with the pleats providing a surplus of vulcanized rubber to close the punctures of a layer of raw unvulcanized rubber, or other healing compound which is forced into the punctures or ruptured portions, by the air pressure in the tube and adheres to the neighboring surfaces of the rubber and has the effect of sealing the puncture forming a permanent closure. The provision of such a layer of adhesive in connection with the provision of surplus vulcanized rubber distributed as described is believed to provide a more certain and permanent closure of the punctures than any device previously in use, as the surplus of normally compressed vulcanized rubber completely overlaps the punctures eliminating all tendency of the adhesive to flow out, and the adhesive itself seals the free edges of the punctures completing the closure effected by the overlapping or meeting edges of the vulcanized rubber which, as aforesaid are lapped over the opening instead of being withdrawn therefrom, the latter being the condition which prevails in a stretched tube.

Fig. 4, is a section showing a layer 5, of raw unvulcanized rubber between the inner and outer tube members 1 and 2, extending entirely around the tube, the tube being partially crimped as to the tread surface only as in Figure 2. Figure 5, shows a similar layer 5, of unvulcanized rubber extending entirely around the tube between the inner and outer tube members, the crimps or pleats also extending entirely around the tube. Figure 6, is a section showing a layer of healing compound 6, or raw rubber extending over the tread surface only between the inner and outer tube sections, the crimped portion likewise covering the tread surface only as in Figure 2.

The features of the invention may be used separately, or in combination, and the double tube walls are not necessary, being merely a preferred means for retaining the healing material.

Figure 8:
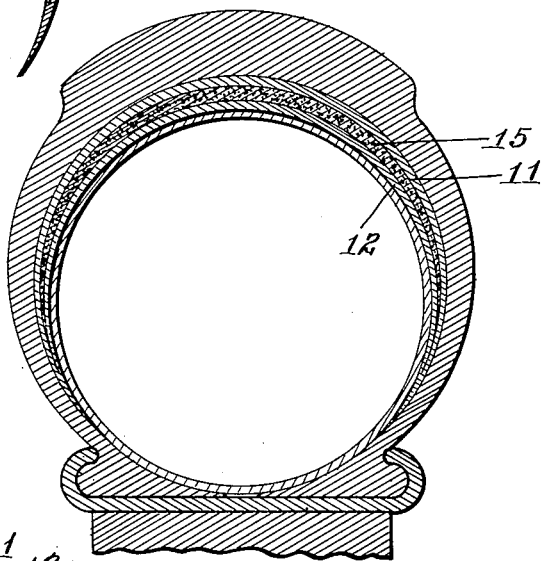
Fig. 8, shows the same in position in a casing.
Figure 9:
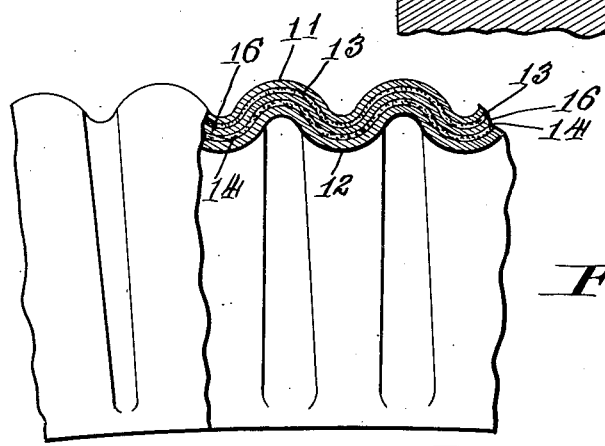
Fig. 9, is a longitudinal section corresponding to Figure 2, showing instead of a single layer of unvulcanized rubber, two layers, between which is a pocket containing a comparatively soft fluid puncture healing material.

In Figures 7, 8 and 9, I have illustrated a shield constructed in accordance with my present invention, but intended to cover the tread portion only of the tube to protect the tube from punctures. This may be used in connection with new or old tubes, being preferably coated with cement and placed in the casing between the casing and the tread portion of the tube, the tube being immediately inflated, the shield being thus flattened and the cemented surface brought in close contact with the tube, causing the two surfaces to adhere in the desired close relation.

More particularly the shield illustrated in Figures 7, 8 and 9, consists of a pad or covering, preferably formed of two layers of vulcanized rubber 11 and 12, having between them a layer of unvulcanized rubber or other adhesive material 15, exactly corresponding to the layers 1, 2 and 5, in the structure previously described. This shield may, however, be formed as illustrated in Figure 9, having between the layers 11 and 12, two layers of unvulcanized rubber 13 and 14, adjacent each outer layer and a filler 16, between said layers of unvulcanized rubber, the same consisting of more fluid healing material than the unvulcanized rubber 13 and 14. In case of puncture, this material not only closes the aperture as described in the above cited patent, but flows through the aperture and enters the space between the tube and the shield so that the shield may, if desired, be used without cementing to the tube, such cementing as is necessary taking place automatically in case of puncture.

I have thus described specifically and in detail several embodiments of my invention in order that the nature and operation of the same may be clearly understood, however, the specific terms herein are used descriptively rather than in a limiting sense, the scope of the invention being defined in the claims.

What I claim and desire to secure by Letters Patent is:

1. An inner tube for automobile tires consisting of an outer tubular member and an inner tubular member, both being pleated and a layer of adhesive between the members, the pleats being so proportioned that they are substantially flattened when the tube is inflated to its full diameter in a casing.

2. An inner tube for pneumatic tires having a portion of the wall thereof formed in plaits, extending transversely to the length of the tube, the plaits being so disposed that they are flattened when the tube is inflated within the casing, the plaited portion of the wall being formed of two layers spaced apart and a quantity of adhesive material between said two layers the flattening of the plaits providing surplus material which prevents stretching and tends to expand and close any punctures which may be formed, the flattening of the plaits also serving to further compress the adhesive material and provide an extra supply thereof to be forced into the punctures when formed.

Signed by me at Baltimore, Maryland, this 23rd day of October, 1922.

EDWARD FETTER.

Witnesses:
 PORTER H. FLAUTT,
 BETTY V. LEITCH.